(No Model.)
A. R. PRITCHARD & J. M. SELLMAYER.
ABRADING MACHINE.
No. 570,184. Patented Oct. 27, 1896.
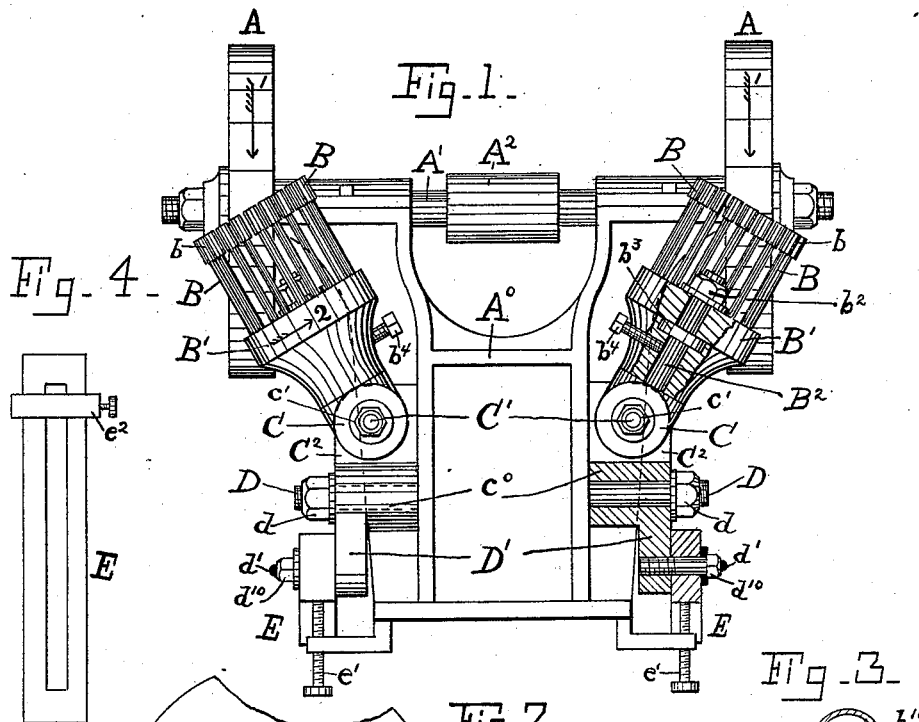
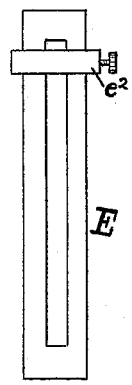
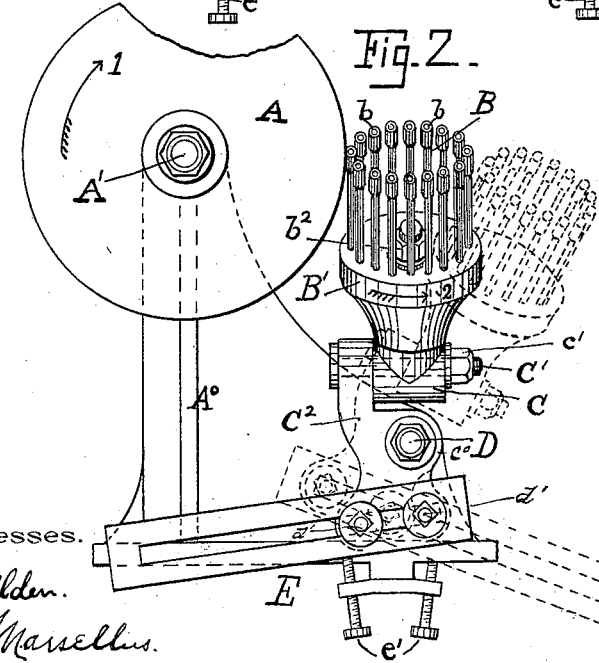
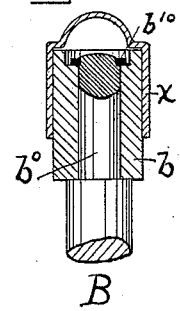
Witnesses.
A. R. Selden.
E. H. Marsellus.
Inventors:
Albert R. Pritchard
John M. Sellmayer
by Howard L. Osgood
their Attorney.

UNITED STATES PATENT OFFICE.

ALBERT R. PRITCHARD AND JOHN M. SELLMAYER, OF ROCHESTER, NEW YORK.

ABRADING-MACHINE.

SPECIFICATION forming part of Letters Patent No. 570,184, dated October 27, 1896.

Application filed May 8, 1896. Serial No. 590,789. (No model.)

*To all whom it may concern:*

Be it known that we, ALBERT R. PRITCHARD and JOHN M. SELLMAYER, citizens of the United States, and residents of the city of Rochester, county of Monroe, and State of New York, have invented certain new and useful Improvements in Abrading-Machines, of which the following is a specification, reference being had to the accompanying drawings, in which—

Figure 1 is a front elevation of a machine embodying our invention, certain parts being shown in section to exhibit construction. Fig. 2 is an end elevation of one of our machines. Fig. 3 is a view, partly in section, of an individual holder or chuck upon its post or support; and Fig. 4 is a detail showing a modification.

The object of our invention is to produce a simple, durable, efficient, and automatic abrading-machine.

Our invention consists in the devices and combinations hereinafter set forth and claimed, and it is intended to make claims herein commensurate in breadth with the novelty of our device, and said claims should not be limited more than is made necessary by the state of the art.

In the drawings, $A^0$ is the frame of the machine.

A A are abrading-wheels or buffing-wheels set on a shaft $A'$, supported in the frame $A^0$ and provided with a driving-pulley $A^2$.

B B B are a series of parallel posts or supports set in a circle and firmly fastened upon a moving base $B'$, which is revoluble on a spindle $B^2$ in the axis of the imaginary cylinder in which the posts are set. Each post B carries on its end a chuck or holder $b$, perforated on an axis in the line of the post and held on an axial stud $b^0$ on the end of the post in any suitable manner, as, for instance, by the washer $b^{10}$, held to the stud $b^0$ by upsetting the end of the stud, as shown in Fig. 3, whereby the chuck $b$ is freely revoluble with reference to the post B. The spindle $B^2$ is fastened at its lower end in a collar C, and the revoluble base $B'$ is held on said spindle in any suitable manner, as by the nut $b^2$. The axes of the spindle and of the chucks or holders are parallel, or substantially so. The collar C is set on a stud $C'$ at right angles to the spindle $B^2$ and to a substantially vertical plane passing through the axis of the buffing-wheel A; but the line of the stud $C'$ does not pass through nor touch the shaft $A'$ under ordinary circumstances. The stud is fixed in a movable frame or support $C^2$. A nut $c'$ holds the collar C on the stud $C'$ and clamps the collar thereon, and hence the base $B'$ can be fastened at any desired angle to the plane of the buffing-wheel A. A stud D, parallel to the shaft $A'$ and at right angles to the plane of the collar C and stud $C'$, passes through a boss $c^0$ on the support $C^2$, and is provided with a nut $d$ for holding the support thereon; but the support is capable of oscillation on the stud D. The stud D is fixed to the frame $A^0$. An arm $D'$ extends downward from the support below the stud D and bears, in the form of device shown, a pair of bolts $d'$ $d'$, provided with nuts $d^{10}$ $d^{10}$, and on these bolts there slides a heavy slotted bar E.

Suitable stops on the frame $A^0$ are provided for limiting the extent of oscillation of the frame $C^2$, which may either come in direct contact with said frame, or, as shown, the stops $e'$ $e'$ may limit the motion of said bar E and hence limit the motion of said support.

The operation of the machine is as follows: A series of small articles, such as the ferrules $x$, are set one upon each of the chucks $b$, and the bar E is moved upon the bolts $d'$ $d'$ to the position shown in full lines in Fig. 2. The length and weight of the bar then tilt the support $C^2$ and consequently the base $B'$, around the axis formed by the stud D, and thus a post B is brought in contact with the abrading-wheel or buffing-wheel A. (See Fig. 2.) The wheel A revolves at a suitable rate of speed in the direction of the arrow marked 1 in Fig. 2, and the friction thereof against the ferrule $x$ causes the chuck or form $b$ to revolve on the stud $b^0$, if the axis of the stud is set at a suitable angle, preferably acute, (say from thirty to forty-five degrees,) to the plane of the wheel. During the abrading or polishing operation the weight of the bar E, if the same is in a position such as shown in full lines in Fig. 2, holds the objects to be abraded or polished against the wheel A with a pressure which can be regulated by the distance of the farthest end of the bar E from the stud D and by its weight. The revolution of the chuck $b$ automatically brings the various portions of the ferrule into position to be acted upon by the wheel A, and its surface is thus abraded or polished; but the friction of the wheel upon the ferrule also causes the base B' to revolve on its spindle B² in the direction of the arrow marked 2 in Figs. 1 and 2, if said spindle is at an angle to the plane of the wheel A; and since the chucks or holders are set in a circle having the produced axis of the revoluble base as a center the ferrules are successively and automatically brought into contact with the wheel A. A sliding stop $e^2$, Fig. 4, may be put on the bar E to limit the extent of its motion on the bolts $d'$, and consequently the pressure of the articles to be abraded may be adjusted to a nicety. A sliding weight may be fastened on the bar E, if desirable, to increase the pressure against the abrading-wheel.

Thus by our device each ferrule is automatically turned to be abraded or polished on all sides and the ferrules are automatically brought into position to be individually polished.

It will be obvious that the nearer the axes of the chuck $b$ and of the base B' are brought into a plane parallel to the plane of the abrading-wheel A the less rotation there will be of the chuck $b$ and base B' and the slower will be the rotations of said chuck and base. Consequently the abrading will be greater. And, conversely, the more nearly the chuck and base are brought into a plane at right angles to the plane of the abrading-wheel the less will be the abrading and the more rapid their rotations. The action of the machine is very rapid and uniform and a much higher and more uniform abrasion and polish are given to the ferrules than can be produced by the most expert handwork, which latter was the only method known to us before our invention herein described.

When the ferrules are sufficiently abraded or polished, the operator pulls the bar E into the position shown in dotted lines in Fig. 2, and the weight and leverage of the bar tilt the base B' into the position shown in dotted lines in said figure, thus removing the work from the buffing-wheel, stopping the revolution of the base B', and placing the machine in position for easy removal of the work from the chucks or forms. The abraded or polished ferrules are now removed and a set of unfinished ferrules are put in their places and the operations above set forth are repeated.

It is obvious that this machine is applicable to abrading articles of various forms and that the holders or chucks may be varied to suit the particular articles and that the machine may be otherwise varied or modified within the broad scope of the following claims.

What we claim is—

1. The combination, in an abrading-machine, of a movable base, a series of holders set upon said base in positions to be moved successively to an abrading position, and an abrading-wheel having its plane of revolution at an acute angle to the plane in which the movable base moves, whereby the holders are brought successively to the face of the wheel by the friction of said wheel on the articles upon said holders.

2. The combination, in an abrading-machine, of a movable base, a series of revoluble holders set upon said base in positions to be moved successively to an abrading position and an abrading-wheel having its plane of revolution at an acute angle to the plane in which the movable base moves, whereby the holders are brought successively to the face of the wheel by the friction of said wheel on the articles upon said holders.

3. The combination of an abrading-wheel, a revoluble base set at an acute angle to the plane of revolution of said wheel, and a series of revoluble holders on said base set in a circle having the produced axis of the base as a center, whereby the holders are brought successively to the face of the wheel by the friction of said wheel on the articles upon said holders.

4. The combination of an abrading-wheel, a revoluble base set at an acute angle to the plane of revolution of the wheel, and a series of revoluble holders on said base set in a circle having the produced axis of the base as a center, each holder being revoluble on an axis parallel to the axis of the base, whereby the holders are brought successively to the face of the wheel by the friction of said wheel on the articles upon said holders.

5. The combination of an abrading-wheel, a revoluble base set at an acute angle to the plane of revolution of the wheel and a series of revoluble holders on said base set in a circle having the produced axis of the base as a center, each holder being revoluble on an axis parallel to the axis of the base, and a tilting supporting-frame for said revoluble base.

6. The combination of an abrading-wheel, a revoluble base set at an acute angle to the plane of revolution of the wheel and a series of revoluble holders on said base set in a circle having the produced axis of the base as a center, each holder being revoluble on an axis parallel to the axis of the base, a tilting supporting-frame for said revoluble base, and a weighted lever attached to said supporting-frame for pressing said holders against said wheel.

7. The combination of an abrading-wheel, a revoluble base set at an acute angle to the plane of revolution of the wheel and a series of revoluble holders on said base set in a circle having the produced axis of the base as a center, each holder being revoluble on an axis parallel to the axis of the base, and a sliding bar sliding on fixed guides on said supporting-frame whereby the holders are tilted to press against said wheel and are tilted away therefrom.

8. The combination of an abrading-wheel, a revoluble base set at an acute angle to the plane of revolution of the wheel, a revoluble base, means for setting said base at different angles to the plane of the wheel, and a series of revoluble holders on said base set in a circle having the produced axis of the base as a center.

9. The combination of an abrading-wheel, a revoluble base set at an acute angle to the plane of revolution of the wheel, a revoluble base, means for setting said base at different angles to the plane of the wheel, and a series of revoluble holders on said base set in a circle having the produced axis of the base as a center, each holder being revoluble on an axis parallel to the axis of the base.

10. The combination of an abrading-wheel, a revoluble base set at an acute angle to the plane of revolution of the wheel, a revoluble base, means for setting said base at different angles to the plane of the wheel, a series of revoluble holders on said base set in a circle having the produced axis of the base as a center, each holder being revoluble on an axis parallel to the axis of the base, and a supporting-frame carrying said base and its connected parts and adapted to be tilted to and from the abrading-wheel.

11. The combination of an abrading-wheel, a revoluble base set at an acute angle to the plane of revolution of the wheel, a revoluble base, means for setting said base at different angles to said plane of the wheel, a series of revoluble holders on said base set in a circle having the produced axis of the base as a center, each holder being revoluble on an axis parallel to the axis of the base, and a supporting-frame carrying said base and its connected parts and adapted to be tilted to and from the abrading-wheel, and a weighted lever connected to said tilting supporting-frame for pressing said holders against said wheel.

12. The combination, in an abrading-machine, of an abrading-wheel A, a revoluble base B', an axial pivot $B^2$ whereon said base revolves, a supporting-frame $C^2$ pivoted to the main frame of the machine on a pivot D parallel to the axis of the wheel A, a pivot C' attached to said supporting-frame at right angles to the pivot D and bearing said axial pivot $B^2$, means for fixing said pivot $B^2$ at various angles with reference to the plane of revolution of the wheel A, a series of supports B upon said base B' and parallel to the pivot $B^2$ and at equal distances therefrom, and a chuck or holder $b$ upon each support B and revoluble thereon on an axis parallel to the pivot $B^2$, substantially as described.

13. The combination, in an abrading-machine, of an abrading-wheel A, a revoluble base B', an axial pivot $B^2$ whereon said base revolves, a supporting-frame $C^2$ pivoted to the main frame of the machine on a pivot D parallel to the axis of the wheel A, a pivot C' attached to said supporting-frame at right angles to the pivot D and bearing said axial pivot $B^2$, means for fixing said pivot $B^2$ at various angles with reference to the plane of revolution of the wheel A, a series of supporting-posts B upon said base B' and parallel to the pivot $B^2$ and at equal distances therefrom, a chuck or holder $b$ upon each post B and revoluble thereon on an axis parallel to the pivot $B^2$, guides, as the bolts $d'$, upon said supporting-frame $C^2$, a weighted bar sliding upon said guides for overbalancing said supporting-frame $C^2$ to hold the same in two positions, one to press the chucks or holders $b$ against the abrading-wheel and the other to hold the same away from said abrading-wheel, and stops, as $e'$, for limiting the motion of said supporting-frame $C^2$, substantially as described.

ALBERT R. PRITCHARD.
    JOHN M. SELLMAYER.

Witnesses:
 E. H. MARSELLUS,
 HARRY PEASE.